Jan. 12, 1965　　J. STEVENSON, JR　　3,165,193
ARTICLE HANDLING APPARATUS
Filed July 20, 1962　　5 Sheets-Sheet 1
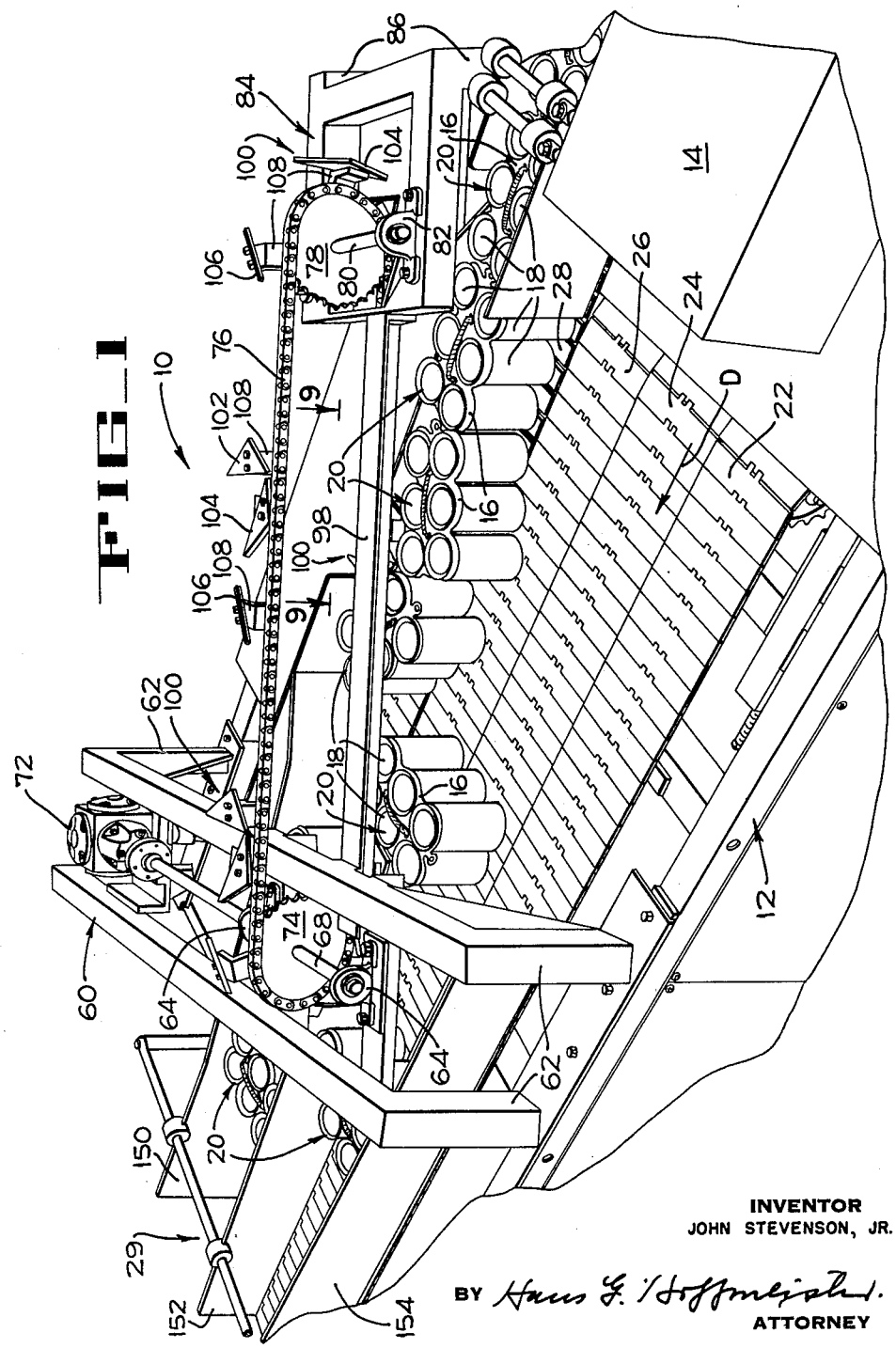
INVENTOR
JOHN STEVENSON, JR.
BY Hans G. Hoffmeister
ATTORNEY

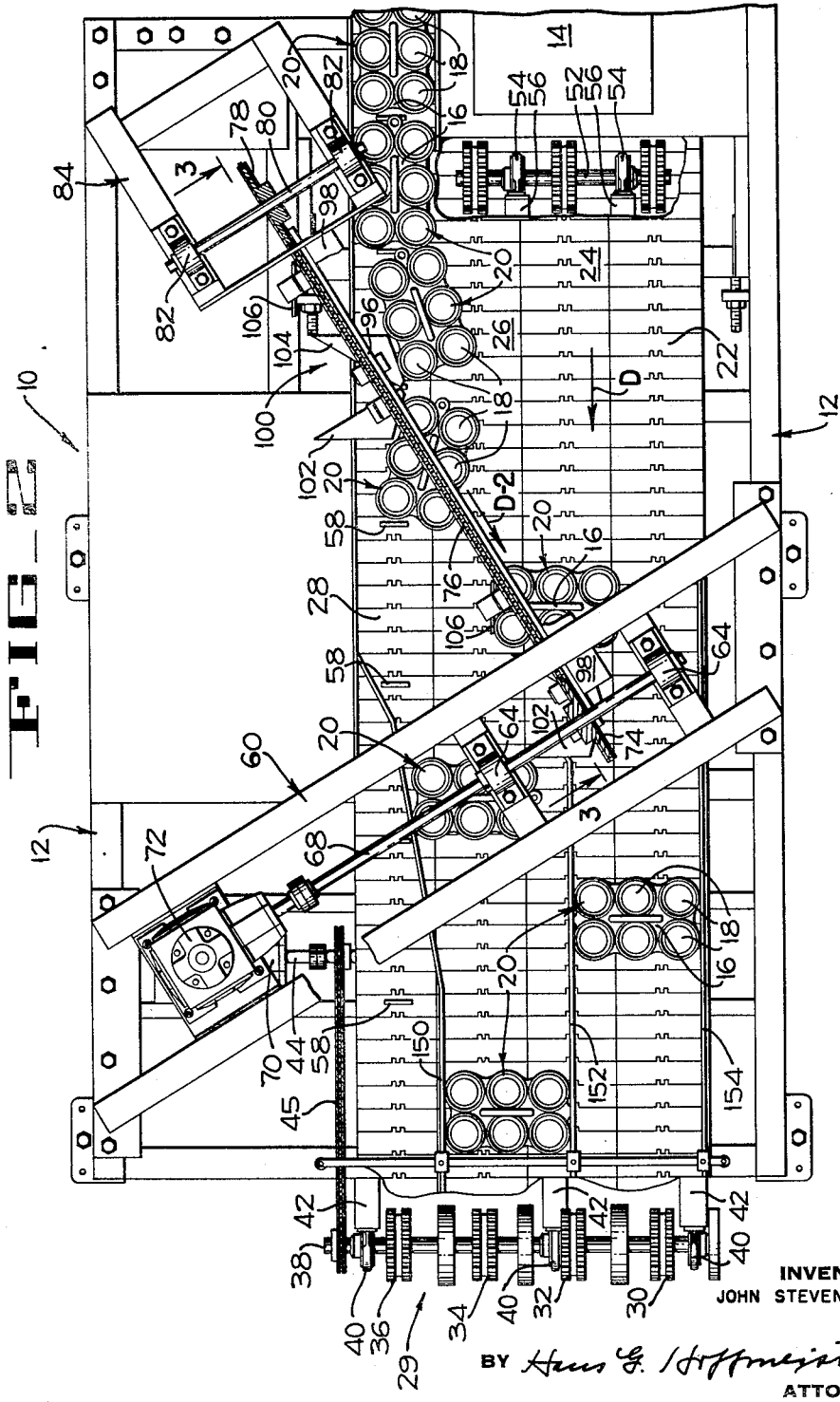

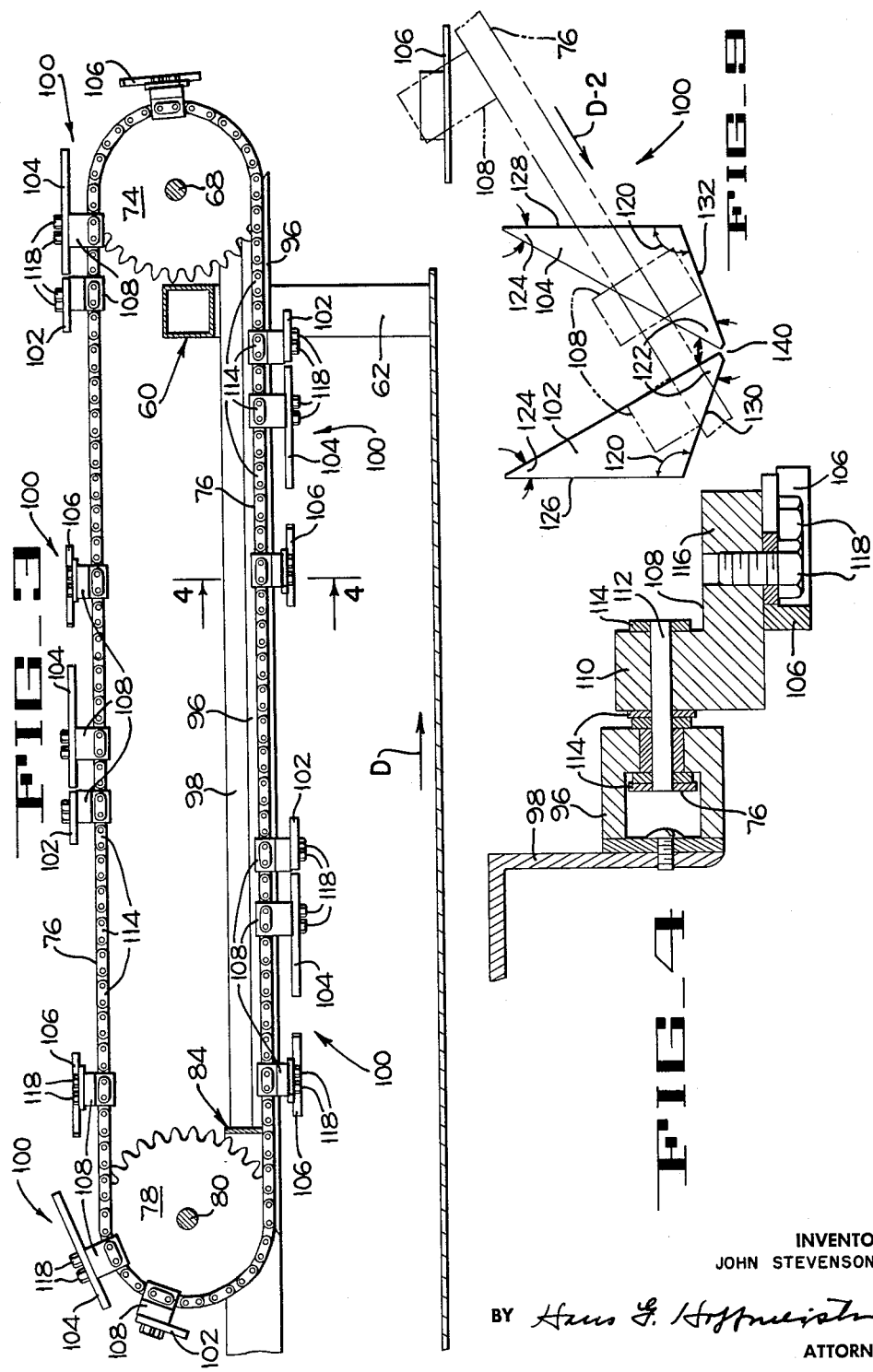

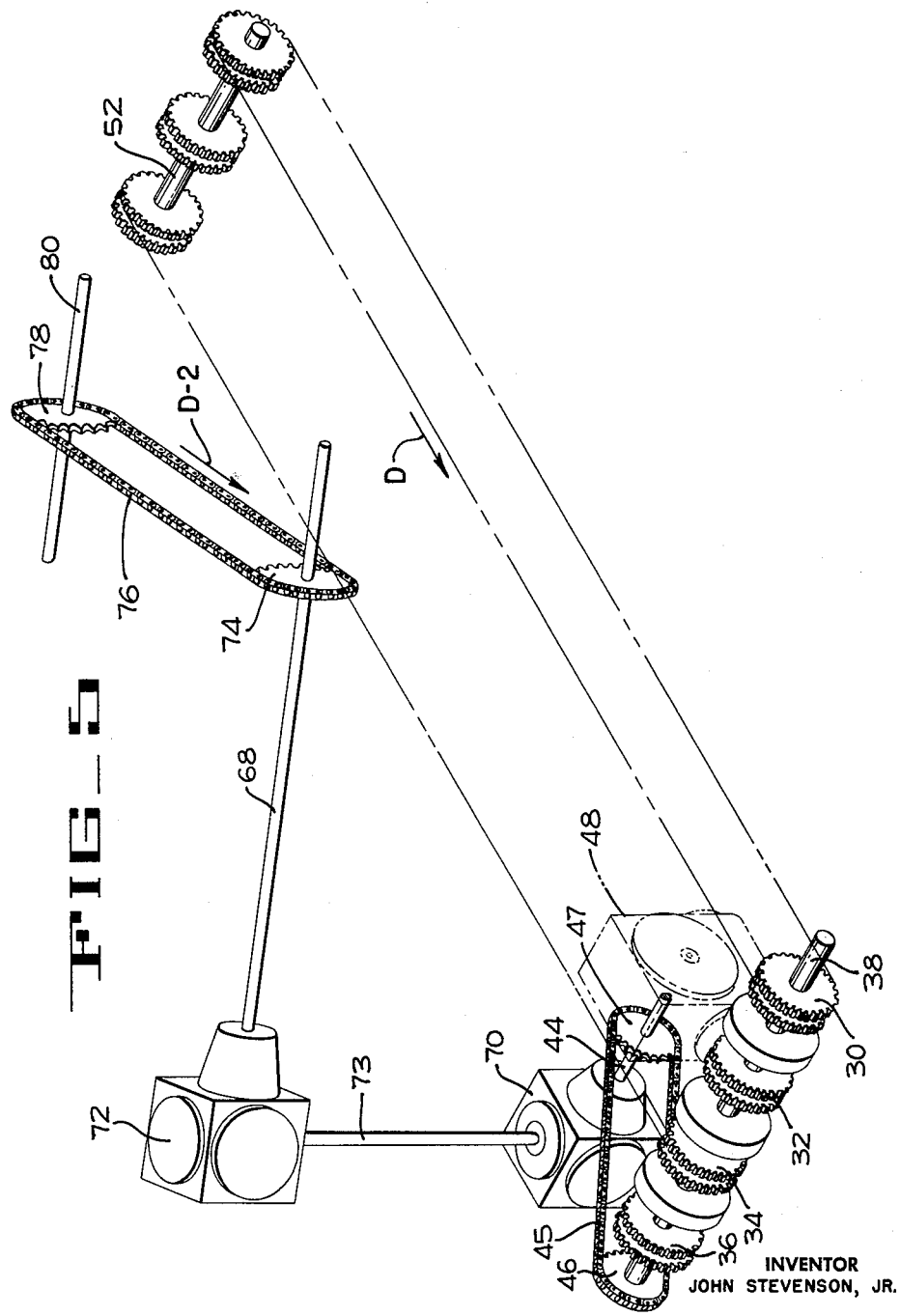

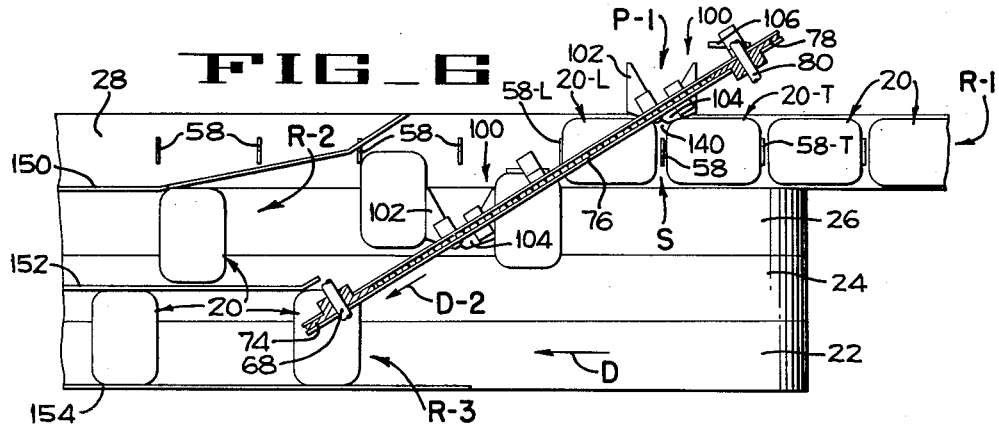
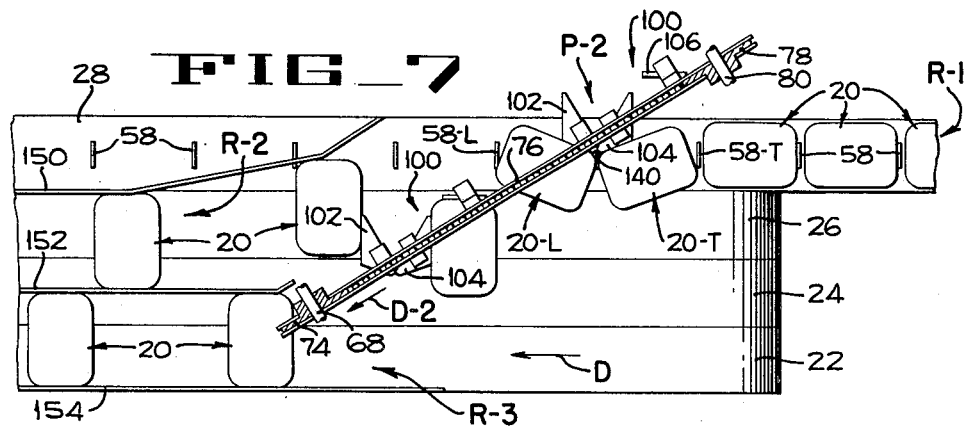
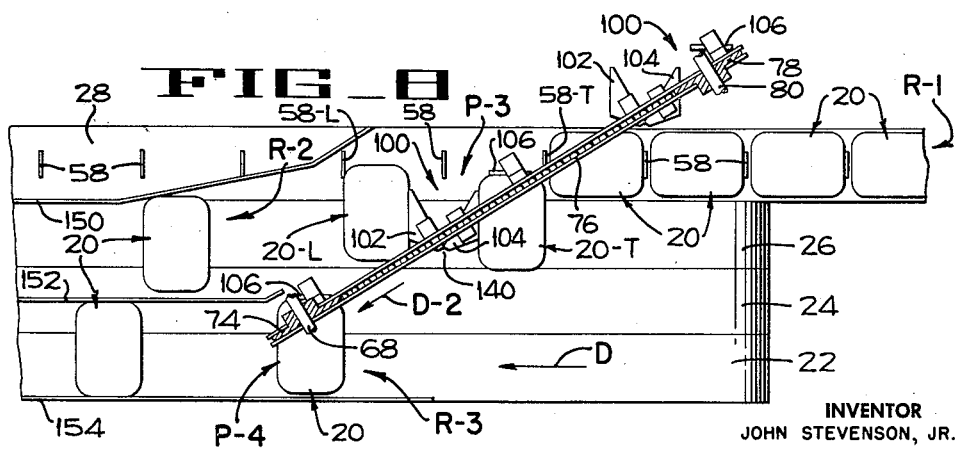

United States Patent Office 3,165,193
Patented Jan. 12, 1965

3,165,193
ARTICLE HANDLING APPARATUS
John Stevenson, Jr., Hoopeston, Ill., assignor to FMC Corporation, San Jose, Calif., a corporation of Delaware
Filed July 20, 1962, Ser. No. 211,184
15 Claims. (Cl. 198—31)

This invention relates to article conveying apparatus, and pertains more particularly to machines for conveying, arranging and orienting articles.

It is a common marketing procedure to pack several cans or bottles in a small package bound together by means of a convenient carrier, thus to facilitate packing, stacking, and, particularly, carrying several cans or bottles. Such units are known in the trade as "six-packs" or "eight-packs" or by a similar term indicating the number of cans or bottles per unit. Beer and other beverages are the commodities most commonly marketed in this way, although the practice is becoming increasingly popular in marketing other products, such as pet foods and scouring powder.

Such multiple packages, hereinafter called "packs" are encased in shipping cases, or cartons, for distribution to the retailer, usually with twelve or more packs to the carton. In high speed operations involving assembly and encasement of the packs, an automatic machine places the cans or bottles into the carrier or attaches the carrier to them, depending upon the nature of the carrier, and the assembled packs issue from the machine in rapid succession in a single file procession, and in an "end-wise" orientation, i.e., with their longer sides parallel to their direction of travel. However, the operation of placing the packs within the shipping cases is facilitated if the packs are delivered to the encasing station in a double row and in a "side-ways" orientation, i.e., turned ninety degrees from their original orientation so that their shorter sides are parallel to their direction of travel. The apparatus of the present invention performs automatically these line-dividing and reorienting operations.

It is to be understood, however, that the invention is not restricted to use in handling multi-pack packages, but is adapted (by appropriate dimensional modification if necessary) to perform line dividing and reorienting operations on other types of articles.

An object of the present invention is to provide an improved article conveying apparatus.

Another object of the invention is to provide an improved apparatus for dividing a single file procession of moving articles into a plurality of rows or files.

Another object is to provide an improved apparatus for reorienting continuously advancing articles.

Another object is to provide an improved apparatus for performing simultaneously the operations of line dividing and article reorientation.

Another object is to perform the operations of turning articles and rearranging them into multiple rows without varying the rate of advance of the articles being turned and rearranged.

Another object of the invention is to provide an article arranging apparatus which is particularly adapted for, but is not limited to, use in arranging groups of canned or bottled products, each of which groups is bound together by a convenient carrier, such as the commonly known multiple packs of canned or bottled beer or carbonated beverages.

Another object is to provide a machine adapted to receive a continuous succession of articles such as multiple packs of a canned or bottled product, as they issue in single file from a machine which binds them together in groups, or packs, for convenient carrying, to turn each pack ninety degrees from the orientation in which it is received, and to rearrange the packs from the single file procession in which they are received into a double file for more convenient placement into shipping cartons.

Another object of the invention is to provide an article arranging machine which operates smoothly and quietly, and which handles the articles gently so as to avoid inflicting damage upon the articles, such as denting of the cans or breakage of the bottles, and defacement of labels on the cans or bottles and on the package constituting the carrier by which they are bound together in the event that the carrier employed bears a label.

Other objects and advantages of the present invention will become apparent from the following description and the accompanying drawings, in which:

FIGURE 1 is a perspective of the article arranging and orienting machine of the present invention.

FIGURE 2 is a top plan of the machine of FIG. 1.

FIGURE 3 is a fragmentary section along lines 3—3 of FIG. 2.

FIGURE 4 is an enlarged section along lines 4—4 of FIG. 3.

FIGURE 5 is a diagram in perspective showing the drive mechanism of the machine.

FIGURES 6, 7, and 8 are diagrammatic plan views showing successive stages in the operation of the machine.

FIGURE 9 is an enlarged, diagrammatic, fragmentary detail, viewed as indicated by the lines 9—9 of FIG. 1.

The drawings illustrate the invention as embodied in a machine 10 for conveying and reorienting six-packs of the type commonly employed in the brewing and soft drink industries, and for rearranging the packs from a single file procession into a double file. This machine 10 includes a frame 12 in line with and adjacent the discharge end of a machine 14 (FIGS. 1 and 2) which attaches a carrier 16 to six cans 18, thus binding the cans together in a package, or unit 20, of the six-pack type.

Four parallel, plate-type conveyors 22, 24, 26 and 28 operate longitudinally of the machine to receive the packs 20 from the carrier-attaching machine 14 and to carry the packs to a discharge station 29 (which may be the station where the packs are placed in shipping cartons) while the machine 10 performs its above described functions of reorienting and rearranging the packs. The conveyors 22, 24, 26 and 28 are supported at the discharge end of the machine 10 upon sprockets 30, 32, 34 and 36, respectively (FIG. 2), all of which are rigidly secured to a shaft 38 rotatable in bearings 40, each of which is mounted on an extension 42 of the frame 12. The shaft 38 is connected to a drive shaft 44 by a chain 45 trained around sprockets 46 and 47 (FIG. 5) which are rigid with the driven shaft 38 and the drive shaft 44, respectively. The drive shaft 44 is journalled in suitable bearings (not shown) mounted on the frame 12 and is driven by a motor 48 (FIG. 5) carried by the frame below the conveyors.

The three conveyors 22, 24 and 26 are supported at the receiving end of the machine 10 by sprockets carried by an idler shaft 52 rotatable in bearings 54 carried by frame extensions 56. The fourth conveyor 28, however, is a continuation of the can-handling conveyor of the carrier-attaching machine 14, and therefore the idler, or "tail" sprocket (not shown) of the conveyor 28 is mounted on the frame of that machine rather than on the frame 12 of the machine 10. The conveyor 28 is provided with upstanding cleats, or flights 58 (FIG. 2), the spacing of which is only slightly greater than the length of a pack 20.

Suitable guides (not shown) are provided to support the upper runs of the several conveyors between the driving and idler sprockets thereof to keep the upper runs flat and to maintain their co-planar alignment. The driving sprockets 30, 32, 34 and 36 are all of the same pitch diameter, and since they are all secured to and are rotated by the common drive shaft 38 the conveyors all operate at the same velocity, the direction in which their upper runs move being from right to left as viewed in FIGS. 1 and 2, and from left to right as viewed in FIG. 3 as indicated by the arrows D in those figures An overhead frame, or bridge 60 (FIGS. 1 and 2) extends obliquely across the machine 10, being rigidly mounted upon the frame 12 by legs 62. Aligned bearings 64 mounted on the bridge 60 rotatably support a horizontal shaft 68, which is driven by the motor 48 through the above mentioned drive shaft 44 and two angle drives 70 and 72 operably interconnected by a vertical shaft 73. The shaft 68 carries a sprocket wheel 74 rigid therewith, and a chain 76 trained thereon is also trained around an idler sprocket wheel 78 carried by a shaft 80 which is rotatable in bearings 82 mounted on an auxiliary frame 84 rigidly mounted on the frame 12 by legs 86 which support the shaft 80 at such height above the frame 12 that the chain, or at least the lower run thereof, is horizontal, and, therefore, parallel to the horizontal plane within which the upper runs of all of the convyors 22, 24, 26 and 28 operate. The plane of the chain 76, of course, is perpendicular to the obliquely extending shaft 68. Consequently, the chain 76 also is oblique to the conveyors, the direction in which the chain inclines being toward the conveyor 22 and toward the discharge end of the machine 10. The gearing (not shown) within the angle drives 70 and 72 is so arranged that the lower run of the chain 76 moves obliquely toward the discharge end of the machine as it moves above the conveyors 24, 26 and 28 as indicated by the arrow D-2 of FIGS. 2, 5 and 9. Further, the chain 76 is driven faster than the conveyors 22, 24, 26 and 28, the ratio between their respective speeds being such that the component of the velocity of the lower run of the chain 76, measured parallel to the motion of the upper runs of the conveyors, is equal to the velocity of the conveyors. This is accomplished by selection of the sprockets 30, 32, 34 and 36 (all of which are of the same diameter) 46, 47 and 74 with appropriate respective pitch diameters.

It will be understood, therefore, that when the machine 10 is in operation, a given point in the lower run of the overhead chain moves diagonally across the three conveyors 28, 26 and 24 in that order, and thus approaches a position above the conveyor 22, and at the same time moves toward the discharge end of the machine at the same speed as a given point on the upper run of any of the conveyors 22, 24, 26 and 28.

The lower run of the overhead chain 76 is guided and held in a straight horizontal line by a channel shaped track 96 supported by an angle member 98 rigid with and extending between the two auxiliary frames 60 and 84. The chain 76 carries a plurality of groups 100 (FIGS. 1, 2, 3 and 6–8) of turner and pusher members. Each group 100 includes two turner plates 102 and 104 which are in the lead, and a pusher bar 106 which follows. Each is attached to the chain 76 by an L-shaped bracket 108 (FIG. 4) the vertical leg 110 of which is mounted upon extensions of two adjacent ones of the pins 112 which pivotally interconnect the links 114 of the chain 76. The horizontal leg 116 of each bracket 108 has a turner plate 102 or 104 or a pusher bar 106 (as the case might be) attached to its underface by two cap screws 118.

The shape of the turner plates 102, 104 and of the pusher bar 106, and their relative arrangement, as well as their manner of operation, can best be understood with reference to FIG. 9 and the operational views, FIGS. 6–8. The two turner plates are of the same size and shape, each being in the form of a triangle having one obtuse angle 120 and two acute angles 122 and 124 of slightly different magnitude. The two triangular plates 102 and 104 are so related that their two sides 126 and 128 of intermediate length are parallel to each other, and are perpendicular to the direction of motion of the conveyors when the part of the chain 76 to which the plates are attached is in the lower run thereof. The shortest sides 130 and 132 incline toward each other at an angle of approximately 130 degrees, and they therefore cooperate with each other to present a blunt penetrating point, or prow 140 which points transversely across the conveyors 28, 26 and 24. The spacing between the corresponding parts of the groups 100 (i.e., their center-to-center spacing) corresponds substantially to the sum of the lengths of two of the packs 20; and the groups 100 are so related to the conveyor 28 that as the prow 140 of a group 100 passes across the conveyor 28, it is almost, if not directly, above one of the cleats 58 thereof, and therefore in proper position to enter into the space between two packs 20 entering the machine 10 on the conveyor 28.

As above mentioned, the third member of each group 100 is a pusher bar 106. It is so positioned with respect to the chain 76 that when the part of the chain to which it is connected is in the lower run, the bar is parallel to the direction of movement of the conveyors. Furthermore, the bar trails behind the second turner plate 104 only far enough for the leading end of the bar 106 to be spaced slightly behind the trailing edge 128 of the second turner plate 104, as most clearly shown in FIG. 9.

Referring now to the operational views, FIGS. 6–8, when the machine 10 is in operation, the packs 20 are fed into the machine in rapid succession in the single file procession R-1 on the conveyor 28, as shown at the right hand side of these figures. While thus being fed into the machine 10, the packs are advancing endwise, the longer sides of each pack being parallel to its direction of advance; and each pack is closely followed by one of the cleats 58.

In the following description of the operation of the machine, the progress of two packs 20 through it will be explained, with the understanding that all packs passing through the machine are similarly handled therein. The two packs 20 whose handling is to be described are identified in FIGURES 6–8 as pack 20–L, this being the leading one of the two, and pack 20–T, this being the next following pack in the procession of packs entering the machine.

As the two packs 20–L and 20–T enter the machine, the prow 140 presented by the turner plates 102 and 104 of one of the groups 100 of turner members, lines up with the space S between the two packs, and, as the packs advance on the conveyor 28, said plates 102 and 104 are carried diagonally forward and toward the opposite side of the machine because of the oblique position of the overhead chain 76 with relation to the conveyors. Consequently, the prow 140 approaches and enters said interpack space S, as shown at P–1 in FIG. 6, and while doing so, the prow 140 retains its position of transverse alignment with the space S since both the plates and the packs advance toward the discharge end of the machine at the same velocity.

It is important to observe that the angularity of the chain 76 with respect to the conveyors is considerably less than forty-five degrees, since this causes the transverse component of the plates' velocity to be considerably less than the component thereof measured parallel to the direction of conveyor movement, with the result that the prow 140 enters the space S comparatively slowly and engages the proximate cans 18 so gently as to avoid damage to them or to their labels.

As the packs 20–L and 20–T continue their forward movement, the plates 102 and 104 continue their rectilinear movement diagonally thereof, causing the prow 140 to penetrate more deeply into the inter-pack space S, and to effect widening thereof in the event that the leading pack 20–L is not already in contact with the cleat 58–L immediately in advance thereof and the trailing pack 20–T is not already in contact with the cleat 58–T immediately behind it. From then on, continued transverse motion of the plates 102 and 104 causes them to press against the respectively proximate corner cans 18 of the packs 20–L and 20–T, respectively, and thereby push the trailing end of the leading pack 20–L and the leading end of the immediately following pack 20–T toward the opposite side of the machine, as shown in FIG. 7. This causes the packs 20–L and 20–T to pivot clockwise and counterclockwise, respectively, each about its associated cleat 58–L and 58–T, respectively, as indicated at P–2 in FIG. 7. This pivotal movement of the packs continues until both packs are disposed in position with their longer sides perpendicular to the direction of movement of the conveyors, as indicated at P–3 in FIG. 8.

When the packs 20–L and 20–T have thus been reoriented ninety degrees, the convergent edges 130 and 132 of the turner plates 102 and 104 no longer abut against the packs, and the only parts of the plates which from then on engage the packs are the edges 126 and 128, both of which are perpendicular to the direction of movement of the conveyors and are, therefore, incapable of effecting any further transverse movement of the packs. Consequently, the only further movement of the leading pack 20–L is the straight line, forward movement thereof which results from its engagement with the conveyors 28 and 26, since the packs, in being turned through ninety degrees, are moved partly off the conveyor 28 and partly onto the conveyor 26, as shown at P–2 and P–3. In other words, after the plates 102 and 104 have completed their function of reorienting the packs, they have no further influence upon them.

However, very soon after the pacts have completed their ninety degree pivotal movement, the pusher rod 106 comes into engagement with an end of the trailing pack 20–T, as shown at P–3 in FIG. 8, since it, also, is moving diagonally across the conveyors. The trailing pack 20–T then resumes its transverse motion, without any interruption in its forward motion, until the pack 20–T is pushed off the conveyor 26, almost across the conveyor 24, and partly onto the conveyor 22 as indicated at P–4 in FIG. 8. At this time the pusher rod 106 rises out of engagement with the pack 20–T as a consequence of its travel around the sprocket 74, and transverse movement of the pack 20–T ceases. As in the case of the leading pack 20–L, the trailing pack 20–T is shifted laterally from the infeeding conveyor 28, all the way to its desired offset relation with its companion pack without any interruption in its forward motion.

Consequently, the packs 20 are rearranged by the machine 10 from the single file procession R–1 in which they are supplied to the machine, into two rows or files R–2 and R–3, as shown at the left hand ends of FIGS. 6–8; and simultaneously with this rearranging operation, the packs are reoriented, so that whereas they are advancing endwise while entering the machine, they are advancing sideways when leaving it.

Guide plates 150, 152 and 154 may be provided in positions downstream from the overhead chain 76 to assist in shifting the packs laterally into, and/or to retain the arrangement thereof in, the lanes R–2 and R–3, if circumstances of any particular installation make such additional guiding means desirable.

Because of the constant, straight line or rotary motion of all moving parts of the machine, it operates smoothly and quietly, even when operating at high speed, and its handling of the packs is so gentle that denting of the cans, disturbance of their grouping and of the engagement of the carriers 16 therewith, and tearing, abrading, and scratching of the cans' labels is avoided.

While a particular embodiment of the present invention has been shown and described, it will be understood that the apparatus is capable of modification and variation without departing from the principles of the invention and that the scope of the invention should be limited only by the scope and proper interpretation of the claims appended hereto.

The invention having thus been described, what is believed to be new and desired to be protected by Letters Patent is:

1. Article arranging apparatus comprising a first conveyor for advancing articles, a second conveyor mounted adjacent said first conveyor, means moving diagonally across said first conveyor to engage an article on said first conveyor to effect turning of said article to a position of predetermined angular orientation relative to its orientation while being advanced by said first conveyor, and means moving diagonally across said first conveyor to engage an article advanced by said first conveyor and effect lateral displacement thereof onto said second conveyor.

2. Article arranging apparatus comprising a first conveyor for advancing articles, a second conveyor mounted adjacent said first conveyor, means moving diagonally across said first conveyor to engage two of said articles and to turn them to positions of predetermined angular orientation with respect to their orientation while being advanced by said first conveyor, and means moving diagonally across said first conveyor to engage one of the two articles turned by said turning means and propel said one of said two articles laterally into offset relation with the other of said two articles.

3. Article arranging apparatus comprising conveyor means for advancing articles in single file procession, article deflecting means moving diagonally across said conveyor means in timed relation with movement of the articles thereon and vertically extending article abutment surfaces on said article engaging means for engaging a trailing part of one of said articles and a leading part of the next following article, continued movement of said abutment across said conveying means effecting turning of said leading and trailing articles in opposite directions to positions of predetermined angular orientation with respect to their orientation while being advanced on said conveyor means.

4. Article arranging apparatus comprising conveyor means for advancing articles in single file procession, means moving diagonally across said conveyor means in timed relation therewith to engage a trailing part of one of said articles and a leading part of the next following article, continued movement of said article engaging means across the conveyor means being effective to turn said leading and trailing articles in opposite directions to positions of perdetermined angular orientation with respect to their orientation while being advanced by said conveyor means, and means moving diagonally relatively to said conveyor means and engageable with one of the turned articles to propel it laterally into offset relation with the other of said turned articles.

5. Article arranging apparatus comprising conveyor means for advancing articles in a single file procession, means moving diagonally across said conveyor means in timed relation with movement of the articles in said procession to engage a trailing part of one of said articles and a leading part of the next following article, continued movement of said article engaging means across the conveyor means being effective to turn said leading and trailing articles in opposite directions to positions of predetermined angular orientation with respect to their orientation while being advanced by said conveyor means, and means for engaging one of the turned articles and propelling it laterally with respect to said conveyor means into laterally offset relation with respect to the other of the turned articles.

6. Article arranging apparatus comprising conveyor means for advancing articles, article turning means advancing in rectilinear movement diagonally across said conveyor means in timed relation therewith, and a vertically extending abutment on said article turning means having an abutment surface adapted to engage a side surface of an article advancing on said conveyor means for effecting turning of the engaged article about a vertical axis to a position of predetermined angular orientation with respect to its orientation while being advanced by said conveyor means.

7. Article arranging apparatus comprising conveyor means moving at a predetermined velocity for introducing articles to the apparatus in single file procession, carrier means moving diagonally across said conveyor means at a velocity so much greater than said predetermined velocity that the velocity of the component of the carrier's movement parallel to the direction of said conveyor's movement equals the conveyor's velocity, and deflecting means having a deflecting surface and an alignment surface at an angle to said deflecting surface carried by said carrier means in position to engage one of said articles and turn it about an axis normal to the path of movement of said conveyor means to a position of predetermined angular orientation with respect to its orientation while being advanced by said conveyor means.

8. Article arranging apparatus comprising a conveyor moving at a predetermined velocity for introducing articles to the apparatus in single file procession, carrier means moving diagonally across said conveyor at a velocity greater than said predetermined velocity, the velocity of the component of the carrier's movement parallel to the direction of said conveyor's movement being equal the conveyor's velocity, means carried by said carrier means in position to engage one of said articles and turn it to a position of predetermined angular orientation relative to its orientation while being advanced by said introducing means, and pusher means carried by said carrier and engageable with one of said articles to propel it laterally away from said conveyor.

9. Article arranging apparatus comprising a conveyor moving at a predetermined velocity for introducing articles to the apparatus in single file procession, carrier means moving diagonally across said conveyor at a velocity so much greater than said predetermined velocity that the velocity of the component of the carrier's movement parallel to the direction of said conveyor's movement equals the conveyor's velocity, and means including vertically extending abutment surfaces carried by said carrier means in position for said surfaces to engage a trailing part of one of said articles and a leading part of another of the articles, continued movement of said article engaging means by said carrier means across the conveyor means being effective to turn said leading and trailing articles about axes normal to said conveyor in opposite directions to positions of predetermined angular orientation with respect to their orientation while being advanced by said conveyor means.

10. Article arranging apparatus comprising a conveyor moving at a predetermined velocity for advancing articles in single file procession, carrier means moving diagonally across said conveyor at a velocity so much greater than said predetermined velocity that the velocity of the component of the carrier's movement parallel to the direction of said conveyor's movement equals the conveyor's velocity, a first deflector carried by said carrier in position to engage a trailing part of one of said articles and a second deflector carried by said carrier means in position to engage a leading part of another of said articles, continued movement of said deflectors by said carrier means across the conveyor being effective to turn said leading and trailing articles in opposite directions to positions of predetermined angular orientation with respect to their orientation while being advanced by said conveyor, and pusher means carried by said conveyor for engaging one of the turned articles and propelling it laterally with respect to said conveyor into laterally offset relation with the other of the turned articles.

11. Article arranging apparatus comprising conveyor means for advancing articles in a single file procession, a carrier chain mounted above said conveyor means for movement obliquely across the conveyor means and in the direction of advance of the articles, and article engaging means including vertically extending slanted abutment surfaces carried by said carrier chain for movement thereby in a path intersecting the path of articles moving on the conveyor means to effect turning of articles about axes normal to said conveyor means and entry of said surfaces between adjacent articles advancing on said conveyor means and thereby ensure that said adjacent articles are separated in accordance with a predetermined spacing.

12. Article arranging apparatus comprising conveyor means for advancing articles in a single file procession, a carrier chain mounted above said conveyor means for movement obliquely across the conveyor means and in the direction of advance of the articles, and article engaging means carried by said carrier chain for movement in a path intersecting the path of articles moving on the conveyor means, said article engaging means having a substantially pointed prow pointing transversely of said conveyor means, movement of the turning means obliquely across the conveyor means being effective to enter said prow between adjacent articles advancing on the conveyor means and thereby ensure that said adjacent articles are separated in accordance with a predetermined spacing.

13. Article arranging apparatus comprising conveyor means for advancing articles in a single file procession, a carrier chain mounted above said conveyor means for movement obliquely across the conveyor means and in the direction of advance of the articles, and article turning means carried by said carrier chain for movement thereby in a path intersecting that of articles moving on said conveyor means substantially between adjacent articles to effect turning engagement of the turning means with said adjacent articles, and a pusher bar carried by said carrier chain for movement thereby in a path intersecting that of articles moving on said conveyor means, said pusher bar being moved by said chain into abutting engagement with one of said adjacent articles to propel it transversely of the conveyors into laterally offset relation with respect to the other one of said adjacent articles.

14. Article arranging apparatus comprising conveying means for advancing articles along a predetermined linear path, first means moving diagonally across said conveying means to engage an article on the conveying means to effect turning of said article to a position of predetermined angular orientation relative to its orientation while being advanced by said conveying means, and second means moving diagonally across said conveying means to engage an article advanced by said conveying means and to effect lateral displacement thereof out of said predetermined path.

15. Article arranging apparatus comprising conveying means for advancing articles, article turning means advancing in rectilinear movement diagonally across said conveying means in timed relation therewith, and a vertically extending abutment on said article turning means having an abutment surface adapted to engage a side surface of an article advancing on said conveying means for effecting a simultaneous lateral displacement and turning of the article about a vertical axis to a position of predetermined angular orientation with respect to its orientation while being advanced by said conveying means.

References Cited in the file of this patent

UNITED STATES PATENTS 2,743,807     McKune _____ May 1, 1956

FOREIGN PATENTS 398,422     Great Britain _____ Sept. 14, 1933